United States Patent
McVey et al.

[11] 3,826,128
[45] July 30, 1974

[54] SURFACE DEFORMATION INDICATING APPARATUS

[75] Inventors: James R. McVey; Thomas O. Meyer, both of Spokane, Wash.

[73] Assignee: The United States of America as represented by the Secretary of the Interior, Washington, D.C.

[22] Filed: Feb. 1, 1973

[21] Appl. No.: 328,822

[52] U.S. Cl. ............................................. 73/88 E
[51] Int. Cl. ........................................... G01b 5/30
[58] Field of Search ..................... 73/88 E, 88 C; 116/DIG. 34; 200/16 R

[56] References Cited
UNITED STATES PATENTS

| | | | |
|---|---|---|---|
| 1,778,827 | 10/1930 | Evans | 340/208 |
| 2,725,843 | 12/1955 | Koski | 116/DIG. 34 |
| 2,874,237 | 2/1959 | Shlesinger | 200/4 |
| 3,158,027 | 11/1964 | Kibler | 325/113 |
| 3,234,788 | 2/1966 | Talobre | 73/88 E |
| 3,341,843 | 9/1967 | Walsh | 73/88 E |
| 3,647,994 | 3/1972 | Vozenilek | 200/16 R |

FOREIGN PATENTS OR APPLICATIONS 950,552  2/1964  Great Britain ............... 116/DIG. 34

*Primary Examiner*—James J. Gill
*Assistant Examiner*—Anthony V. Ciarlante
*Attorney, Agent, or Firm*—Thomas Zack; Frank A. Lukasik

[57] ABSTRACT

An apparatus to indicate deformation of a surface such as the interior of a mine, to which it is attached. An anchor bolt assembly with one electrical contact is rigidly fixed into the surface. A movable pressure plate assembly with another electrical contact, engageable by the first contact on the bolt assembly is placed against the surface. When this plate is moved by surface deformations, it causes the contacts to engage each other which results in the actuation of a sensing device. The sensing device can either actuate a transmitter to transmit a frequency modulated signal of a fixed or variable frequency or it can actuate a recording device that records data on the deformation. Several extendable arms may also be included to actuate a transmitter when overhead rocks or other objects fall near the apparatus. The arms may be arranged in a spider-like pattern around the periphery of the pressure plate assembly to which it is pivotally attached. Two spaced electrical contact rings associated with the arms are closed when an object pivots one of the arms. This closure can then actuate the same transmitter the deformation plate could actuate which results in a fixed frequency warning signal being transmitted.

A series of the signals from several transmitters may be fed to a common receiver. By making each signal different and associating the physical location of a given transmitter with a given signal, the deformation that occurs at a given point may be readily segregated from the others. This allows the sending of a warning signal or other type signal to persons in the danger zone.

7 Claims, 5 Drawing Figures

3,826,128

SURFACE DEFORMATION INDICATING APPARATUS

SUMMARY OF THE INVENTION

The apparatus to indicate surface deformations is rigidly attached into the surface by an anchor bolt assembly. One of two electrical contacts is on this assembly, the other contact being on a pressure plate assembly that is mounted on and movable relative to the anchor bolt. When the surface deforms the plate moves such that both contacts engage each other. This action causes a sensor to be actuated to indicate a surface deformation in excess of a predetermined setting has occurred. The sensor may be a transmitter that emits a signal whose frequency is correlated to the specific physical location of the apparatus. A deformation recorder may also be used to sense the amount of surface displacement by recording the quantitative amount of displacement. A further modification has elongated arms added to the basic structure which are pivotted by falling rocks or objects to actuate the same sensing device. This actuated device could be a frequency modulated transmitter or recorder.

The basic problem overcome by our invention was that of constructing a sensitive remotely observable underground signalling device that informs either immediately or in the future, remote observers of surface deformations or falling objects.

It accomplishes this task by the structure indicated by either sending a frequency modulated signal or by recording the data for future reference.

The primary object of this invention is an improved indicating device that indicates surface deformations.

Another object is such an indicating device in which a transmitter emits a signal when the deformation occurs or an adjacent object falls.

Still another object is this same indicating device combined with a recording mechanism to record deformations.

Figure 1:
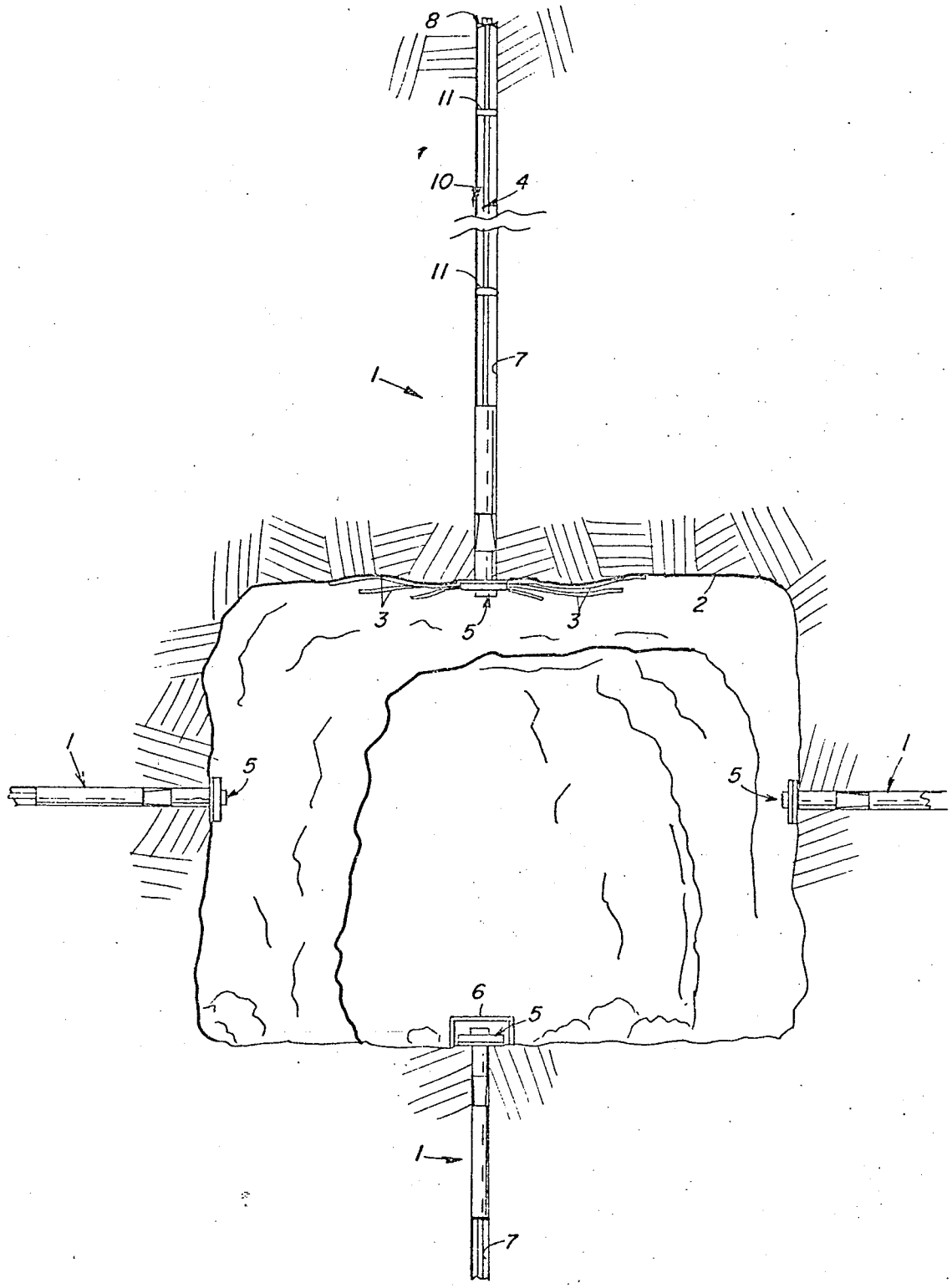
FIG. 1 illustrates several embodiments of our present invention in situ one of which is combined with rock falling detector arms.

Several surface deformation indicators 1 are shown in situ in FIG. 1. Each is identical to the others excepting that the one attached to the ceiling 2 of the underground shaft or mine has pivotally connected arm members 3. As shown in this figure, the indicators may be divided into two major interrelated portions, the anchor bolt assembly 4 and the pressure plate assembly 5. The detailed structure of each of these portions, as well as their specific functions, will be described hereafter. Generally, it is the purpose of the plate assembly 5 to move and then actuate a sensor when the adjacent wall surface deforms due to internal layer shifting or other geological phenomena. The arms 3, which are pivotally attached to the plate assembly, are arranged in a spider-like pattern around its periphery and function to actuate a sensor when adjacent falling objects, like rocks or mine supporting structures fall on them. The lower pressure plate on the ground surface of the mine may have, as an option, a protective cover housing 6 to prevent individuals or equipment from accidently actuating the connected sensor.

Figures 2, 3:
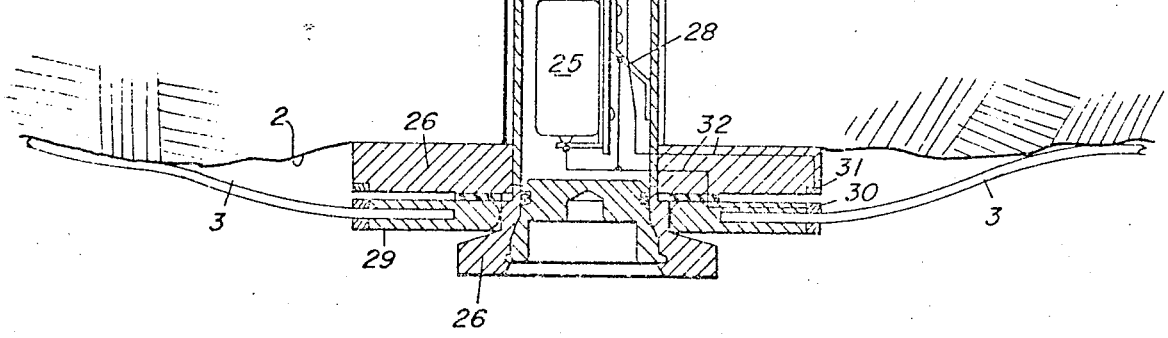
FIG. 2 is a cross sectional enlarged view of the ceiling indicator shown in FIG. 1.
FIG. 3 shows a preferred embodiment of one of the electrical contacts.

In the enlarged cross sectional view of the ceiling indicator 1, shown in FIG. 2, the details of the internal components are illustrated. Except for the lower portion of the plate assembly and arms 3, all of the components may be inserted in a previously drilled vertical bore hole 7 in the mine surface. The uppermost component of the anchor bolt assembly is the retaining unit 8. This unit may consist of a combined nut and washer with a series of overlapping resilient extensions 9 held in place by the nut. An elongated rigid rod 10 has the retaining unit threaded on its upper end. Guide rings 11 may encircle the rod intermediate its end portions to aid in centering and aligning the rod when placed in the bore hole. Rod 10, also referred to as the anchor extension rod, extends into and through the retaining ring 12. It is rigidly held by this ring and extends at its other end within the hollow anchor bolt assembly housing 13.

The anchor bolt assembly 4 rigidly interconnects the aforesaid retaining unit 8, rod 10, ring 12, and external housing 13. Also within this same assembly is a fixed electrical contact member, shown as a conductive foil 20 on a tube 17 (see FIG. 3) that is fixed in lower cap 15. Tubular housing 13 parallels tube 17 and extends past it to where it ends in end plug 19. This plug constitutes the lowest portion of the anchor bolt assembly. Still another electrical contact 21 is part of the anchor assembly and acts to electrically connect movable conductive rod 22 of the pressure plate assembly.

Spiral compression spring 18 is tightly wound around metallic sleeve 16 of the plate assembly and is held in position between and by the internal retaining lips of the cap 15 and end plug 19. It exerts a returning force on movable sleeve 16 when it is displaced and acts to oppose the downward gravitational force on the pressure plate assembly such that it normally remains in the position shown in FIG. 2. Spring 18 by its fricitional contact with sleeve 16 also insures vibrations of inconsequential magnitude will not cause movement of the pressure plate assembly to actuate the sensor. This sleeve 16 is placed concentrically between the two fixed tubes 13 and 17 of the anchor housing and has its contact 14 riding on foil 20 when in an operative condition. Conductive rod 22 is also movable along with sleeve 16 and is constantly in contact with spring contact 21.

By rotating sleeve 16 relative to fixed tube 17 with its foil contact 20, contact 14 will contact the spirally wound foil along a different longitudinal extent when a displacement force is applied depending on the initial rotational angle given to the sleeve. This setting determines the predetermined setting for actuation. Regardless of the angle chosen, contact 21 will still be riding on conductive rod 22 to complete a circuit that includes a wire on board 23, frequency modulated transmitter 24, battery 25, clip 28, and metal sleeve 16 back to contact 14.

At the terminal of the pressure plate assembly is a pressure plate 26 which has its upper surface firmly placed against the ceiling 2 or outer surface of the mine shaft. When surface deformation takes place this disc shaped pressure plate is displaced by the surface (downwardly in FIG. 2) along with the sleeve 16 with its contact 14, as well as rod 22, plus the rest of the pressure plate assembly members. All members of the plate assembly would thus move relative to the fixed members of the anchor bolt assembly including tube 17 with its conductive foil 20. Depending on the initial rotational setting of sleeve 16, the transmitter 24 will be actuated when the predetermined setting is reached.

The predetermined initial setting may be correlated to a specific linear displacement of the pressure plate. For example, suppose the desired setting is 1.5 inches and the displacement range available is 0.1 inch to 2.5 inches as the triggering distances. An operator can rotate a fixed reference line on sleeve 16 to align it with indicia on the outer collar of plug 19 reading from 0.1 to 2.5 inches. The point of alignment, in this case 1.5 inches, would thus be correlated to the rotation angle of the contact 14 relative to spiral foil 20. When the displacement chosen actually occurs, but not before, the sensor is actuated.

In addition to detecting surface deformations in the area immediately in contact with the plate, rock falling detecting arms 3 may be combined with the described detector. Several of those arms are fixedly mounted in a ring 29 in a spider like pattern around its periphery. The inner cross sectional diameter of ring 29 is rounded, as shown in FIG. 2, to provide the pivot action desired as it moves between two bearing surfaces of plate 26. When a rock or other overhead object falls on one of the arms 3, the ring 29 is tilted resulting in the closing of electrical contacts represented by numbers 30 and 31. Each of these contacts is an annular conductive ring. Ring 30 is on tiltable plate 29 and ring 31 is held in pressure plate 26. When these contacts are engaged a circuit is completed to the transmitter 24 via wires 32 which electrically connect the transmitter to housing 16, contact 30, contact 31, battery 25, and board 23. Usually the arms 3 extend several feet out from the plate edge and are pliable enough so that they may be contoured to fit the adjacent roof surface.

Several conclusions should be evident from what has been disclosed. As the pressure plate assembly is rotated relative to anchor bolt assembly for the initial determination of what amount of displacement will trigger the transmitter, it should be apparent that a resistance path can be formed by rod 22 in the circuit. This variable resistance setting can be made to change the frequency of modulation of the transmitter. By associating a specific range or frequency transmitted with a specific amount of plate displacement an observer at a distant receiver can determine the magnitude of the displacement. Further, while the displacement detector and rock falling detector share certain common circuit elements, like the housing 16, transmitter, and battery, they are mutually exclusive from each other in their operation. Notwithstanding their exclusiveness, in the embodiment of FIG. 2 their combined operation is preferred because of the versatility afforded. Should the detectors be used on side wall or floors where the danger of falling surfaces is minimum or non-existent (see FIG. 1), the rock falling arms 3 can be totally eliminated.

Figure 4:
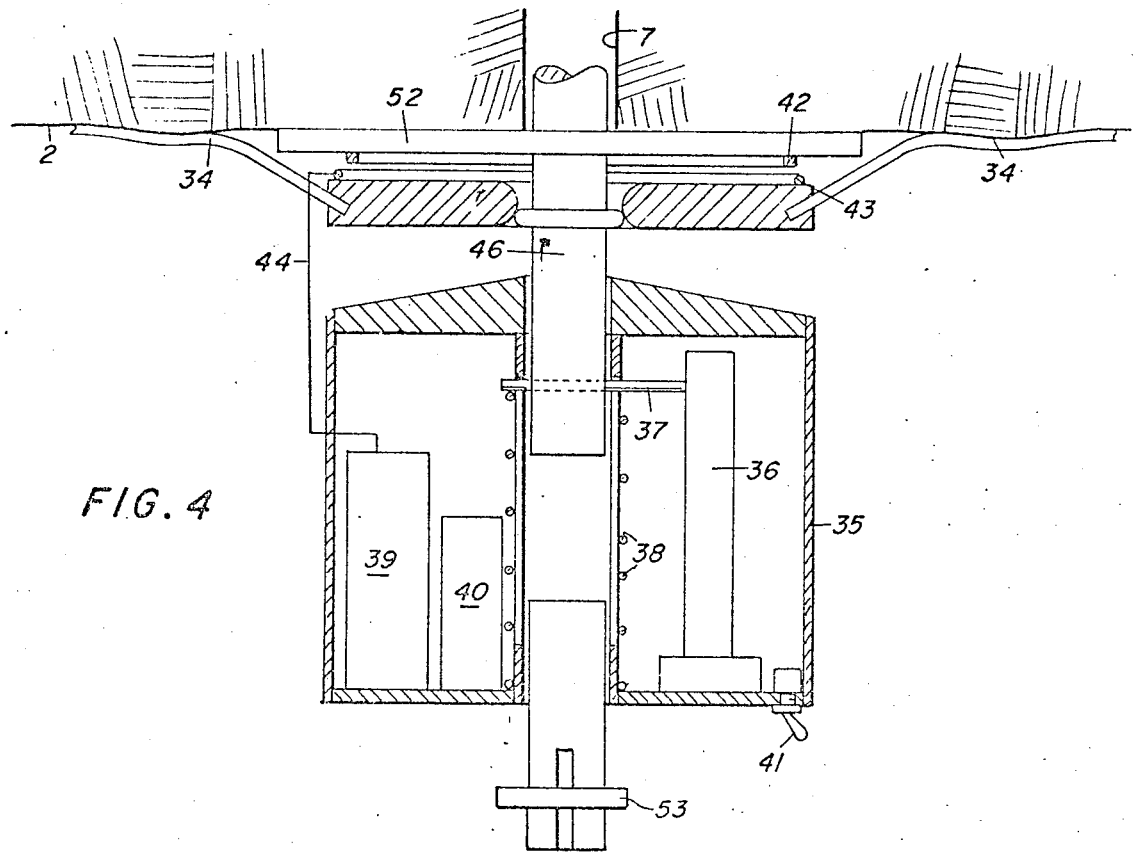
FIG. 4 is a different embodiment of the detector with a variable frequency transmitter.

The embodiment of FIG. 4 provides the same basic functions as the FIG. 2 set up excepting that there is no adjustable initial setting feature. Surface deformation pressure is applied to plate 52 to move rod 46 and then wiper 37 in contact with potentiometer 36 against the biasing action of spring 38. As more displacement of the plate 52 takes place the transmitter 39 sees a different resistance and hence may emit a different frequency. Battery power source 40 and conductive housing 35 also form part of the same circuit. A control switch 41 may be added. The arms 34 function as falling rock detectors and are activated when ring contact 43 and plate 52 touch each other. Wire 44 completes the circuit to transmitter member 39. In this embodiment not only is the initial setting feature eliminated but all of the pressure components are external of the bore hole 7. In the lower extremity of the same hole that encloses rod 46 is a positioning clamp 53 that extends from housing 35 and is used to initially hold the device while it is being inserted in hole 7.

Figure 5:
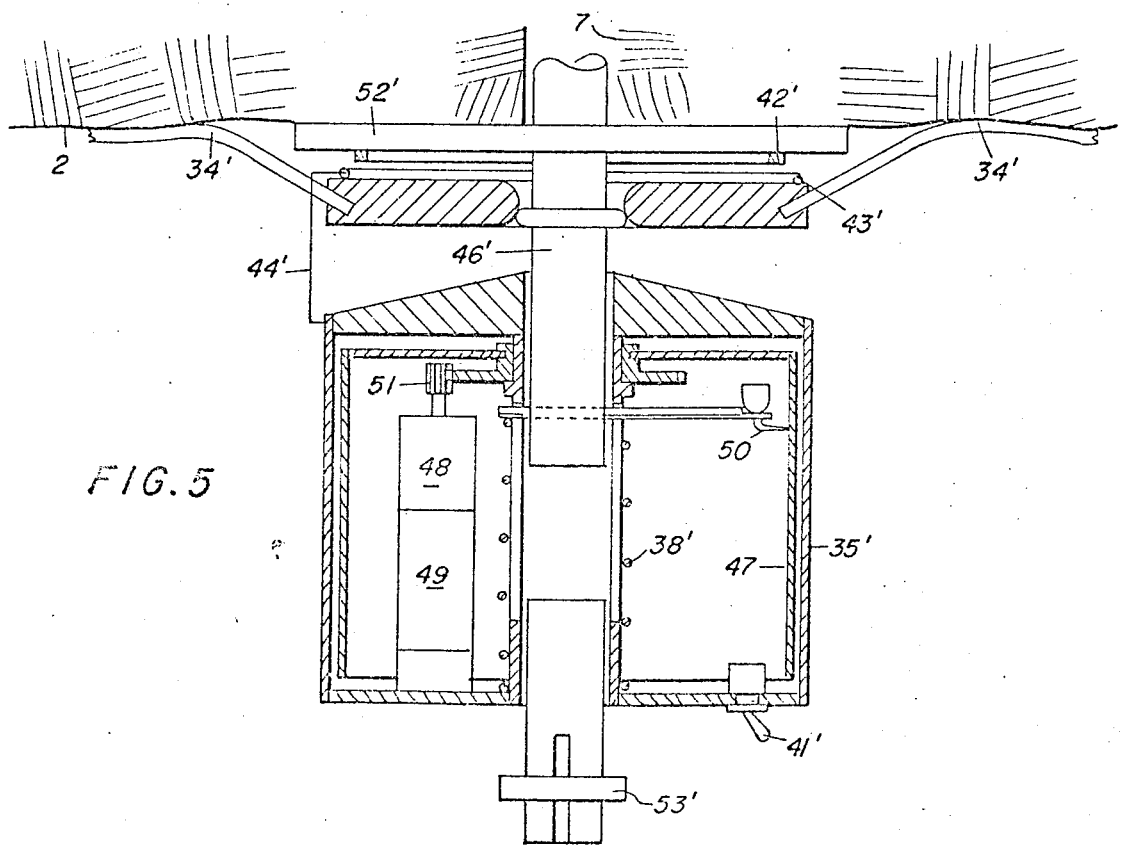
FIG. 5 is still a further embodiment with a deformation recorder.

FIG. 5 is still a further modification that has a recording device in place of the previously described transmitter. Primes have been added to the same numbers used in FIG. 4 that function the same in FIG. 5 and their operation need not be described. Drum 47 rotates when motor 48 is actuated. Power cell 49 (battery) and switch 41' function to cause the rotation and to control the circuit, respectively. This embodiment also has a positioning clamp 53' that functions like clamp 53 of FIG. 4. When plate 52' is displaced downward by greater deformations, rotating geared shaft 51 on motor 48 remains stationary relative to drum 47 but rod 46' and pen 50 move. Thus, when the surface of the drum is later reviewed by an observer, a continuous generally spiral line directly related to the displacement would be observed.

Although the three embodiments shown in FIGS. 2, 4, and 5 have certain noted differences, they also have certain common characteristics. Each is packed in a housing that is sealed to operate in high humidity and temperature conditions normally present in a mine environment. Each has a floating rock bolt (like unit 8 in FIG. 2) to hold the anchor section into the surface. Every embodiment has a self contained power source to either power the frequency modulated transmitter or the recording motor. In each case the initial procedure is to drill a bore hole about an inch and a half in diameter several feet into the surface whose deformation is being measured. Next, if appropriate, after the sensitivity is adjusted, the anchor bolt assembly is shoved into the hole. The pliable extensions 9 of the anchor are designed to allow the unit to be inserted with a moderate amount of force but prevent its disengagement unless a substantially greater amount of pulling force is used.

If a plurality of the FIG. 2 or FIG. 4 transmitting units are randomly spaced on the walls, floor, and ceiling of a mine in different shafts and each unit assigned a distinguishing characteristic, lke an operative transmitting frequency or range, a distant receiver would be able to easily distinguish the unit or units sending a signal. The receiver operator could then alert the miners in the danger area. In such an arrangement line of sight repeater stations would probably be employed intermediate the transmitter and receiver to insure a sufficiently strong signal being received.

None of the specific disclosed embodiments or disclosed uses should be used to limit the scope and extent of this invention which is to be measured only by the spirit of the claims which follow.

What is claimed is:

1. An apparatus for indicating surface deformations comprising in combination:
   an anchor bolt assembly rigidly attached into the surface whose deformation is to be measured extending therefrom to an outer surface wall;
   two normally inoperative electrical contacts, one of which is fixed to said anchor bolt assembly and comprises a conductive spirally wound foil on a tubular member;
   means for operatively adjusting said electrical contacts to determine a predetermined setting at which surface deformations are indicated once a specific surface displacement force has been applied;
   a pressure plate assembly movably mounted on said anchor bolt assembly and having the other of said electrical contacts attached thereon such that it can be operatively engaged by the bolt contact; and
   means for sensing the operative state of said plate assembly to indicate a surface deformation in excess of the determined setting.

2. The apparatus of claim 1 wherein said means for sensing the operative state includes a frequency modulated transmitter that transmits a signal of a known frequency when said contacts are in an operative position.

3. The apparatus of claim 2 wherein
   the frequency of the signal transmitted varies depending upon the amount of displacement of the pressure plate assembly.

4. The apparatus of claim 1 wherein
   said pressure plate assembly comprises:
   a generally flat surfaced plate adapted to engage the surface whose deformation is to be measured and also including pivotally mounted elongated arm members extending outwardly from the periphery of said assembly plate and having electrical contacts such that objects falling on any one of said members will pivot it to cause its associated contacts to be closed and said means for sensing to be rendered operative.

5. The apparatus of claim 4 wherein said sensing means comprises:
   a frequency modulated transmitter that can be rendered operative to emit a signal.

6. The apparatus of claim 1 wherein said conductive spirally wound foil tube has an electrical contact that is connected to a movable conductive rod on the pressure plate assembly.

7. The apparatus of claim 6 wherein the electrical contact on the pressure plate assembly is connected to a movable metal sleeve concentric with the foil tube.

* * * * *